Figure 7:
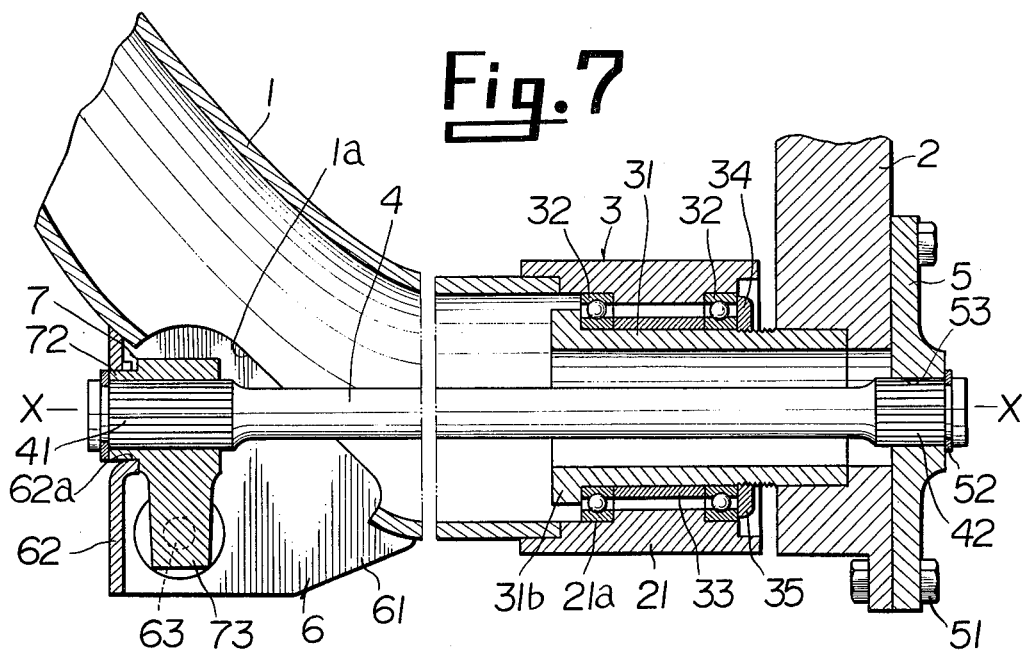

United States Patent [19]

Nagamitsu

[11] 3,931,989

[45] Jan. 13, 1976

[54] CONNECTING DEVICE FOR FRONT AND REAR FRAME OF TRICYCLE

[75] Inventor: Toshiaki Nagamitsu, Ikeda, Japan

[73] Assignee: Daihatsu Motor Company Limited, Osaka, Japan

[22] Filed: June 10, 1974

[21] Appl. No.: 478,087

[30] Foreign Application Priority Data

June 18, 1973  Japan............................... 48-68916
June 18, 1973  Japan............................... 48-72516

[52] U.S. Cl................ 280/283; 280/112 R; 280/282
[51] Int. Cl.².......................................... B62K 5/06
[58] Field of Search............ 280/112 R, 112 A, 282, 280/283; 180/25 R, 27

[56] References Cited
UNITED STATES PATENTS

| | | | |
|---|---|---|---|
| 2,221,196 | 11/1940 | Klavik............................ | 280/112 R |
| 2,819,093 | 1/1958 | Geiser............................ | 280/112 A |
| 2,878,032 | 3/1959 | Hawke.......................... | 280/112 R X |
| 3,504,934 | 4/1970 | Wallis............................ | 280/282 |
| 3,583,727 | 6/1971 | Wallis............................ | 280/283 |
| 3,698,502 | 10/1972 | Patin.............................. | 280/282 X |

FOREIGN PATENTS OR APPLICATIONS

| | | | |
|---|---|---|---|
| 993,029 | 10/1951 | France......................... | 180/25 R |
| 1,224,164 | 9/1966 | Germany........................ | 280/112 R |
| 1,471,948 | 4/1965 | France.......................... | 280/112 R |

*Primary Examiner*—Robert R. Song
*Assistant Examiner*—Terrance L. Siemens
*Attorney, Agent, or Firm*—Pierce, Scheffler & Parker

[57] ABSTRACT

A tricycle having a front frame supported with one front wheel and a rear frame supported with two rear wheels, wherein the front frame is connected with the rear frame on the axis longitudinal of the tricycle in the relation that the front frame is capable of being inclined to one side or the other with respect to the rear frame. The tricycle is provided with a torsion bar arranged between the front frame and the rear frame on the axial line so that the torsion bar is subjected to only torsion not to complicated stresses of bending and tension.

11 Claims, 7 Drawing Figures

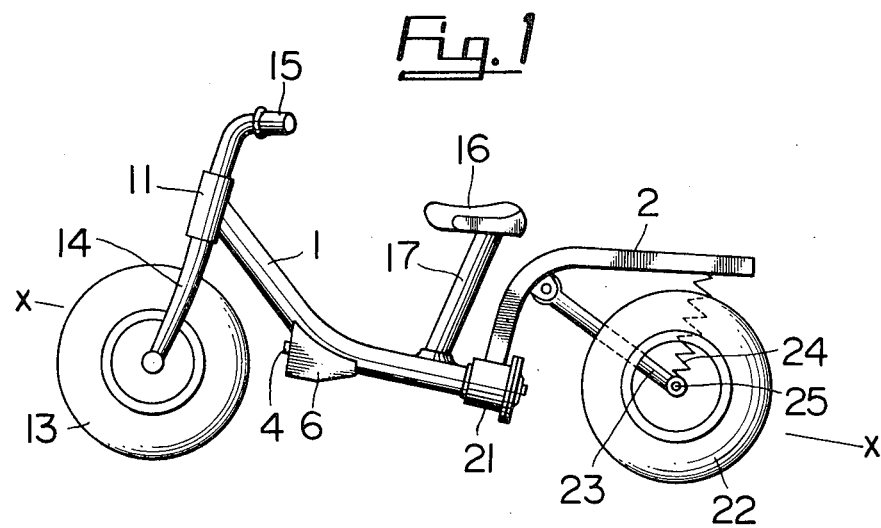
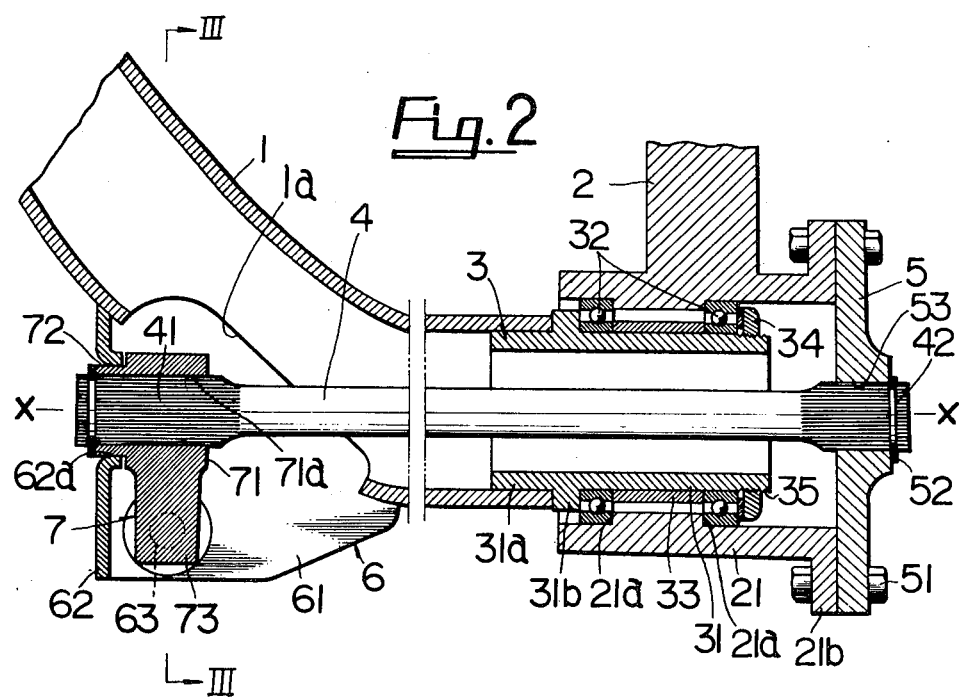

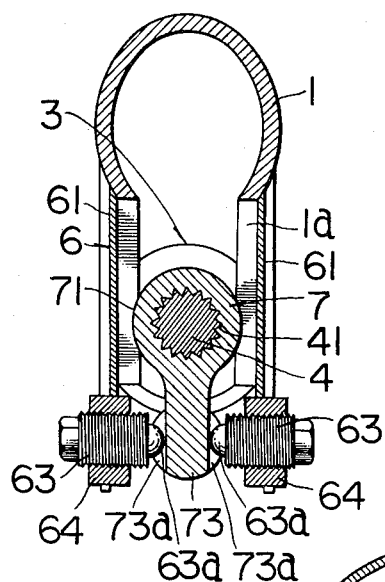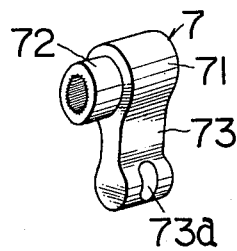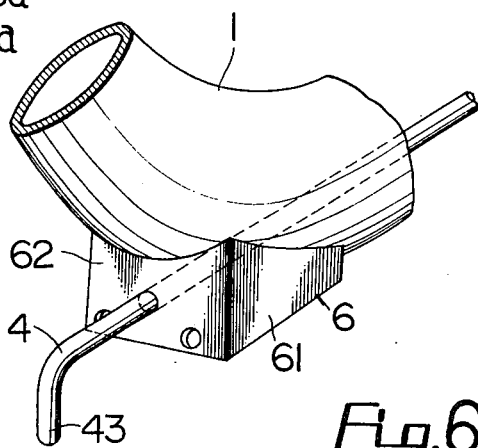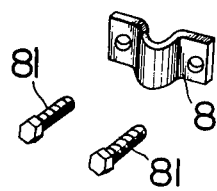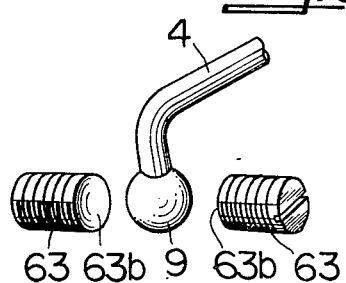

CONNECTING DEVICE FOR FRONT AND REAR FRAME OF TRICYCLE

This invention relates to a a connecting device for a front and a rear frame of a tricycle and more particularly to a connecting device for a front and rear frame of a tricycle which is provided with one front wheel and two rear wheels and driven by pedaling or a driving force from an engine or an electric motor.

Conventionally, there has been proposed a tricycle, for example, as shown in U.S. Pat. No. 3504934 having the frame which is supported with the front and rear wheels and divided into a front and a rear frames, wherein the front frame is provided with a handle bar for operating the front wheel and with a saddle for a rider and is connected to the rear frame with a connecting shaft extending longitudinally of the tricycle in the rotation that these frames may be mutually inclined to one side or the other toward the turning direction from moving up by the centrifugal force or retaining the front frame.

As an example of the aforegoing, well known is a tricycle as shown in U.S. Pat. No. 3583727, provided at both sides of a front frame thereof with two torsion bars extending longitudinally of the tricycle body for fixing both front and rear ends of each torsion bar to the front frame and the rear frame respectively.

In the abovementioned construction, however, when the front frame is inclinded the two torsion bars are subjected to complicate stresses of bending and tension as well as torsion, therefore, there was a defect that torsion bars are liable to become early fatigued to result in the necessity of replacing the worn bar by a new one after use in a very short time.

The present invention has been directed to solve the abovementioned problem concerning a tricycle of which a front frame is inclined against a rear frame so as to enable a rider to drive it in a feeling similar to bicycle-riding and which is provided with a torsion bar for preventing at least one of rear wheels from moving up when a turn is made.

A main object of a connecting device for a front and a rear frame of the invention is the provision of a tricycle having a torsion bar which is not subjected to stress, such as bending and tension except tension, but excellent durability for a long time. Another object of the invention is the provision of a connecting device for a front and a rear frame of a tricycle having a torsion bar which is adapted to be simply mounted to both front and rear frames independently of a connecting means for connecting the both frames so that the torsion bar is subjected to only torsion. A further object of the invention is the provision of a connecting device for a front and a rear frame of a tricycle which is capable of connecting both front and rear frames simply and strictly while the torsion bar is subjected to only torsion stress. Still a futher object of the invention is the provision of a connecting device for a front and a rear frame of a tricycle capable of readily adjusting a front frame to be positioned at the neutral with respect to a rear frame.

The invention has been designed to arrange a torsion bar on the axis of a connecting shaft for connecting both front and rear frames since the torsion bar is subjected to only torsion stress without complicated stresses of bending and tension.

Namely, under condition that the torsion bar is positioned on the abovementioned axis, the front frame inclining against the rear frame may rotate around the axis so that the torsion bar is subjected to only torsion stress generated between the front frame and the rear frame, thus the torsion bar being subjected to no stresses of bending and tension.

Furthermore, the invention is directed to reasonably arrange the torsion bar on the axis in a manner that the connecting shaft for the front and the rear frames is formed in a tubular shape, through which the torsion bar is perforated so that the torsion bar becomes free from the connecting means, thereby making it possible to arrange the torsion bar as the abovementioned without any complicated construction.

In a case that a torsion bar is desired to be arranged on the axis of the connecting shaft, the torsion bar must be fixed between the front and rear frames in a complicated construction as is conventionally designed due to existence of the abovementioned connecting means. The reason is that the connecting means is provided between the rear end portion of the front frame and the front end portion of the rear frame and also the torsion bar is fixed at both ends thereof to the front and the rear frames respectively, accordingly, the connecting means becomes obstructive of arrangement of the torsion bar on the axis of the connecting shaft.

To solve the above problem, a connecting device of the invention shaft is used for connecting both front and ear frames, in which the torsion bar is perforated through the tubular shaft at the center portion thereof, thus making it possible to arrange the torsion bar simply and easily on the axis of the connecting shaft.

In the tricycle of this type, when it is turned in running the front frame thereof is inclined to one side or the other with respect to the rear frame, at the same time the torsion bar serves to prevent the rear wheel from moving up, however, when the tricycle is parking or driven in a straight line the front frame must be positioned at the neutral regarding the rear frame. Nevertheless, if the torsion bar for the tricycle is not uniform in quality of fixed to the frames with a slightly twisted angle, the front frame may be out of the precise neutral position thereof.

Still further, the invention is directed to have an adjusting means at the fixed portion of the torsion bar, which means can adjust the torsion bar around the axis thereof so that the front frame may be positioned at the neutral regarding the rear frame even after fixing the bar to the frames of the tricycle. In addition, the aforesaid neutral position of the front frame is that wherein the front frame rests in the perpendicular position with respect to the rear wheels' common axle when the tricycle is horizontalized.

Such adjusting means employs adjusting screws engagable with the torsion bar at the portion thereof which fixedly connects both front and rear frames therewith. The screws are rotated for turning the torsion bar around the axial line, thereby making it possible to easily set the front frame at the neutral position.

The above described objects and features and others of the present invention will be more apparent from the description of representative embodiments in accordance with the accompanying drawings and further novel features of the invention will be easily understood from the scope of claims in the following, FIG. 1 is a side view showing as a whole a tricycle of the invention, FIG. 2 is a partially cutaway enlarged sectional view showing a principal part thereof, FIG. 3 is sectional view taken on line III—III, FIG. 4 is a perspective view of front fixing member of a modified embodiment, FIG. 5 is an analyised perspective view showing a modified embodiment of a fixing means for a torsion bar, FIG. 6 is a perspective view of other modified embodiment, and FIG. 7 is a sectional view of another modified embodiment corresponding to the principal portion in FIG. 2.

Reffering to FIG. 1, the reference numeral 1 denotes a front frame having a front wheel of a tricycle. The front frame 1 is provided at the front end portion thereof with a head pipe 11 and also is formed in a tubular shape at the rear end portion thereof, and the front wheel 13 is supported to the head pipe 11 through a front fork frame member 14. In addition, the front frame 1 is provided at the foremost end thereof with a handle bar 15 which is connected to the front fork frame member 14 for steering the front wheel 13 and at the rear end portion of the front frame is provided a saddle post 17 fitted with a saddle 16 for a rider. In this instance, the front frame may be made of a pipe member for simplifying the manufacturing process, resulting in having the end portion formed in a pipe-shape.

The reference numeral 2 denotes a rear frame having two rear wheels 22, 22, which frame is provided at the forwardly downwardly end portion thereof with a boss member 21 of a cylindrical shape. The rear wheels 22, 22 are supported with the rear frame through trailing arms 23, 23 and also buffer springs 24, 24 are mounted between the rear wheels 22, 22 and the rear frame 2. One of the trailing arms 23, 23 is provided at the rear end thereof with a driving shaft 25 for driving one of the rear wheels 22, 22.

In addition, the tricycle carries, not shown in the drawings, an engine or an electric motor on a rear frame 2 thereof so that at least one of the rear wheels 22, 22 is forcibly driven by such a power source through a transmitting device, where, it is preferable to drive the tricycle by pedaling silmilarly to a bicycle.

The reference numeral 3 denotes a connecting means for the front frame 1 and the rear frame 2, which is constructed as abovementioned, in the relation that the front frame may be inclined to one side or the other with respect to the rear frame around the axis extending longitudinally of the tricycle. The connecting means comprises a tubular shaft 31 insertable into a round hole perforated through the boss member 21 at the rear frame 2 and radial bearings 32, 32 mounted between an outer peripheral surface of the tubular shaft 31 and an inner peripheral surface of the cylindrical boss member 21. The tubular shaft 31 is short in length and provided at axially one end thereof with a portion 31a insertably engageable with a tubular end rearwardly of the front frame and at the other end of the shaft with screw thread 35 formed on the outer periphery thereof.

The bearings 32, 32 are used in a pair of well known radial bearings which comprise an outer race, an inner race and a plurality of balls respectively and are spaced with a spacer 33 provided at a given interval between each inner race of two bearings. Bearings 32, 32 are fixed in the predetermined position through each outer and inner race abutting against annular notched portions 21a, 21a formed at the boss member 21 and an annular projection 31b at the tubular shaft 31 respectively, and are locked with a lock nut 34 and screwed with the thread 35.

Thus, the tubular shaft 31 is freely rotatably supported with the boss member 21 through bearings 32, 32 and the end portion 31a of the shaft 31 is inserted into the tubular portion of the rear end of the front frame 1 and then is fixed thereto by means of a fixing means such as a screw bolt and the like, thereby making it possible to connect the front frame 1 with the rear frame 2 in the relation that the former can be inclined to one side or the other with respect to the latter around the axis line X—X extending longitudinally of both frames 1 and 2.

Further, instead of fixing the tubular shaft 31 to the front frame 1, a boss member 21 may, as shown in FIG. 7, be provided on the front frame so as to fix the tubular shaft 31 to the front end portion of the rear frame 2.

The reference numeral 4 denotes a torsion bar which is disposed on the axial line X-X and has male serrations 41 and 42 at both ends thereof respectively.

The torsion bar 4 is fixed at the rear end thereof to the boss member 21 through a connection of the male serration 42 at the rear end of the torsion bar and female serration 53 formed at a disc-like shaped support 5 which is secured to a flange 21b at the rear end of the boss member by means of screw bolts 51, 51, and at the front end of the bar 4 to the front frame 1 through a fixing means as described hereinafter. Also the torsion bar 4 is extending from the rear end to the front end thereof through the center of the tubular shaft, the tubular rear end of the front frame and an opening 1a thereof, and then is further forwardly protruded. In addition, the reference numeral 52 denotes a retaining ring used for preventing the torsion bar from axially moving.

The abovementioned fixing means comprises, as is clearly understood in FIG. 2, a bracket member 6 fixed to the front frame 1 and a fixing member 7 mounted to the bracket 6.

The bracket member 6 is positioned on the forwardly extending axis line X—X to be fixedly mounted onto the front frame 1 at a substantially intermediate lower portion thereof and comprises opposite side plates 61, 61 and a front plate 62 connecting two plates 61, 61 therewith. The front plate 62 of the bracket member 6 is provided with a through a hole 62a having the axis coincident with the axis line X—X, and two side plates are screwably engaged with screw bolts 63, 63 through nuts means 64, 64 fixedly fitted to the plates.

The fixing member 7 comprises, as shown in FIG. 4, a body 71 having female serrations 71a engagable with male serrations 41 of the torsion bar 4, a supporting portion 72 extending forwardly of the body 71 to be engageably inserted into the hole 62a so as to support the body 71 with respect to the blacket member 6, and, an arm 73 extending downwardly to the body 71.

The arm 73 is provided with counter hemispherical recesses 73a at both sides of the lower portion thereof respectively. The recesses 73a, 73a receive oval points of screw bolts 63, 63 respectively so that the arm 73 is restrained from radially moving, resulting the fixing member 7 being fixedly supported on the bracket member 6, resulting in fixing the fore end of the torsion bar 4 to the bracket member 6.

Incidentally, the head 63a of the screw bolt 63 is formed in a hexagonal shape for being rotatable by use of a spanner or the like so that the screw bolt 63 may be rotated to optionally position the arm 73. The position of the arm 73 should be so adjusted that the front frame is located at the neutral position thereof, that is, the same stands, as aforesaid, perpendicularly to the common axis of rear wheels when the tricycle is horizontalized, thus, when a turn is made the front frame 1 is inclined from the neutral position to one side or the other so as to allow the torsion bar 4 to be twisted, thereby preventing either one of rear wheels from lifting.

Means for fixing the torsion bar 4 to the boss member and the blacket member, is, as the abovementioned, that the bar is provided at both ends thereof with male serrations with which the support 5 and the fixing members 7 are insertably engaged respectively. Besides this, instead of forming the serrations, the torsion bar may be fixed to the front frame 1 and the rear frame 2 directly or through other fixing means. For example, the torsion bar 4 may, as shown in FIG. 5, be formed at the fore end thereof in a L-shaped portion 43 to which a clamp 8 is fitted so that the bar is fixed to the blacket member 6 with screw bolts 81, 81.

Further, it is preferred that a ball 9 is, as shown in FIG. 6, fixed to the utmost end of the bent portion of the torsion bar and each point of the screw bolts 63, 63 is formed in a ball holder 63b receiving the ball 9 therein. In this case, the screw bolts 63, 63 serve to clamp the torsion bar for being fixed as well as being adjustable.

Means for fixing the torsion bar to the front and the rear frames, is proposed in many different ways as described heretofore. In summary, it is preferred that the axis of the torsion bar 4 is coincident with the axis line X—X extending longitudinally of the tubular shaft 31 so as to be rotatably supported thereto, therefore, a construction other than the embodiments shown herewith may be applied on the tricycle in accordance with the present invention.

The tricycle of the invention is constructed as the abovementioned. When a rider turns a tricycle in its running he tries to lean himself inward the curve, in this instance, the front frame 1 is only inclined to one side or the other with respect to the rear frame 2 through the tubular shaft 31, thus a rider being able to turn a tricycle extremely smoothly and safely while restraining the rear wheels 22, 22 from moving up by means of function of the torsion bar. Namely, tosion stress caused by a rider's leaning acts on an inside rear wheel through the fixing means, the rear frame 2 and the trailing arm 23, thereby making it possible to prevent the rear wheel from moving up in running. Further, when the front frame is inclined in turn of the tricycle the torsion bar is twisted under the condition that both fixed ends thereof become stationary at the center of leaning width of the front frame, that is, at the axis extending longitudinally of the both frames, therefore the torsion bar is only subjected to torsion, namely, any complicated stresses of bending and tension may not at all be applied on the torsion bar.

Accordingly, the torsion bar used in a tricycle in accordance with the present invention becomes less fatigued, increases in the durability and is bearable for a long time use.

Also, for obtaining the aforesaid objects there is used the tubular shaft capable of being enlarged in diameter, hence, the radial bearings therefor are allowed to be made larger in diameter. As a result, the connection of a front and a rear frame can withstand a concentrated load applied thereon so that the front frame may be smoothly inclined when a turn is made. At that time, the connection of the separated frames becomes, of course, subject to a heavy load from vibrations in running on a rough road and a rider's weight, which load causes the connection to be twisted to result in roughly inclining of one of the frames with respect to the other. However, in accordance with the invention the radial bearings may be made larger in diameter to make possible distribution of the load and construction endurable of a heavy weight, thereby completely solving the aforesaid problems.

In addition, the tricycle of the invention has practical effects, such as being simple in construction as well as easy in adjustment for setting the torsion bar at the neutral position because of single bar used in the tricycle.

The front frame 1 which is inclined to one side or the other with respect to the rear frame 2, may cause the tricycle to raise an efficiency in running and a safty operation when the tricycle is turned, and also when the front frame is inclined to either the right or left side at a standstill, it is possible to adjust inclination of the front frame to be corrected very easily, simply and exactly.

The present invention may not be limited to an inherent construction of the embodiments described herewith and it is examplified in the specification rather than defined in the scope of appended claims.

What is claimed is:

1. A connecting device for a front and a rear frame of a tricycle wherein the front frame has a front wheel, a handle bar for steering said wheel and a saddle for a rider, and the rear frame has two rear wheels, said connecting device comprising
    a tubular shaft fixed to one of opposite ends of said front and rear frames;
    a boss member, of cylindrical shape, fixed to the other of said opposite ends;
    radial bearings insertably mounted within said boss member so as to hold said tubular shaft therewith,
    said tubular shaft, radial bearing and boss member similarly having an axis extending longitudinally of the tricycle body,
    said front frame being inclined around the axis to one side or the other enabling a rider to lean when a turn is made; and
    a torsion bar extending through said tubular shaft at the center thereof and positioned coincident with said axis, said torsion bar being insertably mounted between said front and rear frames so as to be fixed at the lengthwise fore end of the bar to the front frame and at the lengthwise rear end of the bar to the rear frame.

2. The connecting device according to claim 1, wherein said tubular shaft is fixed to the rear end of the front frame and said boss member is fixed to the fore end of the rear frame.

3. The connecting device according to claim 1, wherein said tubular shaft is fixed to the fore end of the rear frame and said boss member is fixed to the rear end of the front frame.

4. The connecting device according to claim 1, wherein a fixing means for said torsion bar comprises a bracket member fixed to said frame and a fixing member non-rotatably mounted to one end of said torsion bar, said fixing member being fixed to said bracket member.

5. The connecting device according to claim 4, wherein said fixing member is rotatably supported by the bracket member through a supporting portion of the same and is provided with an adjusting arm extending similarly to the radial direction of said torsion bar so that the fixing member may be held in a non-rotatable state through said arm.

6. The connecting device according to claim 5, wherein said bracket member is secured with a pair of adjusting bolts in the transverse direction of the tricycle body, said bolts being engaged at each tip thereof with both sides of said adjusting arm respectively.

7. The connecting device according to claim 4, wherein said torsion bar is provided at the outer periphery of one end thereof with serrations in the lengthwise direction of the bar so that the bar may be non-rotatably mounted to the fixing member through a serration-connection therewith.

8. The connecting device according to claim 1, wherein said torsion bar is provided at the outer periphery of both ends thereof with male serrations in the lengthwise direction of the bar respectively and a bracket member is fixed to the front frame at the fore end side of the torsion bar, said bracket member having an internally serrated round opening forming female serrations, said torsion bar being fixed at the fore end thereof to the bracket member through engagement of said male serrations with said female serrations and being fixed at the rear end of the bar to the rear frame through a fixing means.

9. The connecting device according to claim 1, wherein said torsion bar is rectangularly bent at one end thereof so as to be fixed to said frame by means of a holder comprising a plate and a screw bolt.

10. The connecting device according to claim 1, wherein said torsion bar is rectangularly bent at at least one end thereof and said frame is secured with a pair of adjusting bolts in the transverse direction of the tricycle body, said bolts being engaged at each tip thereof with both sides of the bend end of the torsion bar.

11. The connecting device according to claim 10, wherein at the bent end of said torsion bar is attached a ball, and said adjusting bolts are formed at each tip thereof in a counter-hemisphere shape so that said tip may be engaged with said ball.

* * * * *